(12) United States Patent
Beasley et al.

(10) Patent No.: US 9,565,861 B2
(45) Date of Patent: Feb. 14, 2017

(54) METHOD OF MAKING SHAPED BAKED GOODS

(71) Applicant: Mars, Inc., McLean, VA (US)

(72) Inventors: Kenneth Beasley, Hackettstown, NJ (US); Shelley Ordiales, Kendall Park, NJ (US); Alexandra Strudwick, Parsippany, NJ (US); Brandon Jahner, Hackettstown, NJ (US); Amy Dombroski, Stanhope, NJ (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 13/757,539

(22) Filed: Feb. 1, 2013

(65) Prior Publication Data
US 2013/0224362 A1    Aug. 29, 2013

Related U.S. Application Data

(60) Provisional application No. 61/752,421, filed on Jan. 14, 2013, provisional application No. 61/593,699, filed on Feb. 1, 2012.

(51) Int. Cl.
| | |
|---|---|
| *A21D 13/08* | (2006.01) |
| *B30B 11/16* | (2006.01) |
| *B30B 15/30* | (2006.01) |
| *A21D 8/06* | (2006.01) |
| *A21D 13/00* | (2006.01) |
| *A21C 11/10* | (2006.01) |
| *A21C 11/04* | (2006.01) |

(52) U.S. Cl.
CPC ............... *A21D 13/08* (2013.01); *A21C 11/04* (2013.01); *A21C 11/10* (2013.01); *A21D 8/06* (2013.01); *A21D 13/0009* (2013.01); *A21D 13/0067* (2013.01); *B30B 11/16* (2013.01); *B30B 15/308* (2013.01)

(58) Field of Classification Search
CPC ..................................................... A21D 13/08
See application file for complete search history.

(56) References Cited

U.S. PATENT DOCUMENTS 1,821,689 A * 9/1931 Broeg .............................. 426/27
3,676,151 A * 7/1972 Scharschmidt ................. 426/94
(Continued)

FOREIGN PATENT DOCUMENTS

DE            10057362 A1 *  5/2002 ............. A21C 11/04

OTHER PUBLICATIONS

"Sugar particle size". Retrieved online from www.biscuitexpert.com on Jul. 9, 2013. p. 1.*
(Continued)

*Primary Examiner* — Jenna A Watts
(74) *Attorney, Agent, or Firm* — Mars, Incorporated; Amy M. Fernandez (57) ABSTRACT

Systems, methods, and formulas are disclosed for producing a shaped baked good with a rounded shape. In one embodiment, the formula may include a high melting point fat and a granular sugar at a weight ratio of about 1:1 to form a rounded cookie piece that minimizes flattening during baking. The cookie composition may be formed by passing a cookie dough between opposing rollers or press plates to form a web. The web may then be baked, rehydrated, separated, and deflashed to form individual rounded cookie pieces.

4 Claims, 6 Drawing Sheets

(56) References Cited

U.S. PATENT DOCUMENTS

| | | | |
|---|---|---|---|
| 3,880,069 A | | 4/1975 | Moline |
| 4,229,487 A | | 10/1980 | Crothers |
| 4,397,880 A | | 8/1983 | Crothers |
| 4,397,881 A | | 8/1983 | Crothers |
| 4,659,582 A | | 4/1987 | Puglia |
| 5,147,669 A | | 9/1992 | Crothers |
| 5,340,598 A | | 8/1994 | Hay, Jr. et al. |
| 5,382,149 A | | 1/1995 | Yates et al. |
| 5,902,621 A | * | 5/1999 | Beckett et al. ............... 426/279 |
| 6,207,207 B1 | | 3/2001 | Belkowski |
| 6,224,920 B1 | | 5/2001 | Reinikainen et al. |
| 6,355,293 B1 | * | 3/2002 | Thota et al. ................. 426/502 |
| 6,555,150 B1 | | 4/2003 | Belkowski |
| 2001/0028909 A1 | | 10/2001 | Kashulines, Jr. et al. |
| 2002/0142070 A1 | * | 10/2002 | Bedi et al. ....................... 426/76 |
| 2003/0148008 A1 | | 8/2003 | Robinovitch et al. |
| 2004/0047962 A1 | | 3/2004 | Takaichi et al. |
| 2010/0021596 A1 | * | 1/2010 | Pontzer ................. A23G 1/205 426/281 |
| 2010/0316772 A1 | | 12/2010 | Zubanas et al. |

OTHER PUBLICATIONS

"Chocolate butter cookies". Retrieved online from www.landolakes.com, available as of Nov. 4, 2010. pp. 1-2.*

"Section 8.4.5—Viscosity for Non-Newtonian Fluids". Taken from ANSYS.com on Jul. 9, 2013. Available online Jan. 29, 2009. pp. 1-7.*

Machine translation of specification of DE 10057362. Publication date: May 23, 2002. pp. 1-7.*

PCT, International Search Report and Written Opinion, in International application No. PCT/US13/24449, dated Apr. 15, 2013. (7 pages).

Kissell, L.T., etc., Effect of Variability in Sugar Granulation on the Evaluation of Flour Cookie Quality, American Association of Cereal Chemists, Inc., 1973, 10 pages, St. Paul, MN.

Jacob et al., "Effect of fat-type on cookie dough and cookie quality", Flour Milling, Baking and Confectionery Technology, Central Food Technological Research Institute, India, Mar. 2006.

* cited by examiner

METHOD OF MAKING SHAPED BAKED GOODS

CROSS-REFERENCE TO RELATED APPLICATIONS

The present application claims the benefit of U.S. Provisional Application No. 61/752,421, filed Jan. 14, 2013, entitled "Shaped Baked Goods" and U.S. Provisional Application No. 61/593,699, filed Feb. 1, 2012, entitled "Shaped Baked Goods", both of which are hereby incorporated by reference in their entirety.

FIELD OF THE INVENTION

One or more embodiments of the present invention relate to a rounded cookie piece composed using a formula that allows the cookie piece to remain rounded after baking and be suitable for coating with chocolate, as well as a process for forming said cookie piece.

BACKGROUND OF THE INVENTION

Currently available cookie dough compositions result in baked cookie pieces that have spread and flattened during baking and cooling. These flattened surfaces have a tendency to "double" during coating operations such as panning with chocolate. That is, due to the rotating tumbling action of the coating pan, the flattened surfaces will come together and two pieces will become coated in chocolate instead of having each piece individually coated in chocolate. When two pieces are coated together, they are referred to as a "double". These "doubles" are considered undesirable from a consumer perspective and should be avoided. Therefore, there is a need to create a cookie piece that retains a rounded shape after baking and cooling and can then be coated with less "doubling".

Turning now to prior art patents, U.S. Pat. No. 5,147,669 (the '669 patent) shows pyramidal cookie pieces coated with chocolate to form rounded lentil shapes. However, the '669 patent does not teach the compositions, specifically with regard to the fat to sugar ratio. Additionally, the '669 patent does not provide a rounded or lenticular cookie piece—only a pyramidal cookie bit. U.S. Pat. No. 4,659,582 generally describes a compressed baked composition that is subsequently baked but there is no teaching of shape and no teaching of fat to sugar ratios or sugar particle sizes.

BRIEF SUMMARY OF THE INVENTION

One or more embodiments of the present invention include a cookie composition including a high melting point fat and granular sugar at a weight ratio of about 1:1 to form a rounded cookie piece that minimizes flattening during baking. The rounded cookie piece that remains as fully rounded as possible (for example, with no or minimal flattening of the cookie piece bottom) is desirable for many applications, including when forming a multi-region confection such as when coating the piece with a chocolate intermediate layer and then a sugar exterior layer to form an M&M'S® Brand Milk Chocolate Candies product, for example.

In one embodiment, the shaped baked good may be composed of two or more portions that may be asymmetric in size and/or shape. Additionally, in one embodiment, the shaped baked good may include a top rounded half that is asymmetric from a bottom rounded half, such as when the top rounded half is thicker than the bottom rounded half. Additionally, the formula, composition, and/or processing of the shaped baked good may be selected so that the dimensions of the shaped baked good change during processing. For example, when the shaped baked good includes a top rounded half and a bottom rounded half and the halves are initially formed with different heights/thicknesses, the formula for the baked good and/or the successive processing steps may be selected to impact the dimensions of the final shaped baked good so that the top and bottom halves are substantially the same height or thickness.

In one embodiment of a process for forming a cookie piece, the cookie piece may be formed from a granular and/or powdered mix that is fed into rotary molds or from a dough that is sheeted and passed through a pair of rotary molds. One example of a suitable rotary mold system is shown in U.S. Pat. No. 6,764,293 entitled "Apparatus For Forming Confectionery Product" which is also owned by the assignee of the present application. In such a system, the cookie dough may be formed into a webbed sheet. The webbed sheet of cookie dough may then be further baked or processed. For example, the cookie dough may be conveyed to a baking oven and baked. The cookie dough may be transported or conveyed to the baking oven using a system such as a belt, for example a flat belt or a belt with rounded depressions.

In such an embodiment, following baking, the webbed sheet of cookie product may then be separated into individual cookie pieces and the cookie pieces de-flashed. Further, the de-flashed cookie pieces may be rounded as part of the de-flashing process or as an additional process step. The cookie pieces may then be coated with a coating such as chocolate to form coated cookie pieces. Additionally, the coated cookie pieces may be further coated or shelled, such as by shelling with sugar to form sugar shelled coated cookie pieces.

DETAILED DESCRIPTION OF THE INVENTION

In some embodiments, manipulating the melting point of the fat, the particle size of the sugar or carbohydrate component, and the weight ratio of the fat to sugar/carbohydrate results in a baked good piece that retains a rounded shape after baking and cooling. Although terms such as "cookie", "cookie dough", and "cookie pieces" have been used herein, such terms are not intended to be limitations on the contents of the edible pieces or the processing steps used to form the edible pieces. Other terms such as "confectionary", "edible", "baked", "processed", "biscuit", "cake", "cracker", "shortbread", "pretzel", "snack", and others may be applied.

Figure 1:
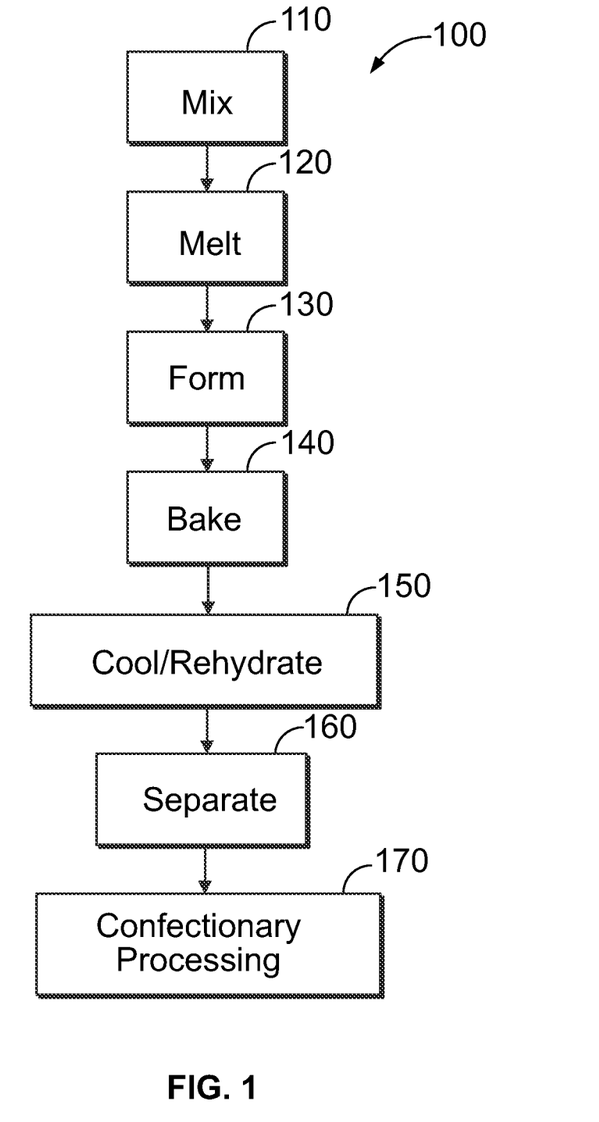
FIG. 1 illustrates a method for producing shaped baked goods according to an embodiment of the present invention.

FIG. 1 illustrates a method for producing shaped baked goods according to an embodiment of the present invention. First, at step 110, the ingredients are mixed or prepared. As discussed herein below, the ingredients may be selected according to any of several formulas. Next, at step 120, the ingredients are melted or otherwise liquefied, plasticized, or made flowable to prepare a bakeable edible substance such as cookie dough. Then, at step 130, the cookie dough is formed. As described herein, the dough is preferably formed into an asymmetric, three-dimensional shape. More specifically, as described herein, the forming is preferably accomplished by using opposing press plates having cavities of a predetermined size or by passing the cookie dough between two opposing rollers having cavities of a predetermined size. The forming preferably provides a plurality of asymmetrically-shaped regions positioned in a web of cookie dough, where the shape of one or more regions is asymmetric about the plane of the web.

Next, at step 140, the asymmetrically-shaped regions positioned in the web of cookie dough are baked. For example, a continuous web of cookie dough with asymmetrically-shaped regions may be output from the rotating rollers and then passed by a conveyor to a baking oven. At the baking oven, the conveyors may advance the cookie dough at a predetermined speed through the oven in order to provide a desired cooking time. Alternatively, when the forming is accomplished using a press plate, the web may be ejected from the press plate, for example by inversion, mechanical induction such as mechanical pins to separate the dough from the plate, or by using air to separate the dough from the plate. The dough may then be relayed by conveyor to the baking area and baked as discussed above.

Then, at step 150, the baked web may be cooled and optionally rehumidified and/or rehydrated depending on the specific formula employed. At step 160, the shaped regions may be separated from the rest of the web, for example by mechanical force, to form individual shaped baked goods. In one embodiment, an individual shaped baked good is substantially symmetric about a plane intersecting the baked good. For example, the baked good may be considered to be substantially symmetric about a plane intersecting the baked good if the top and bottom half of the baked good differ in height or thickness by 20% or less, more preferably by 10% or less, and even more preferably by 5% or less.

Finally, at step 170, the shaped baked goods may be further processed. For example, the shaped baked goods may be coated with sugar, chocolate, or other confectionary, or included as inclusions in a confectionary or other edible product.

Figure 2:
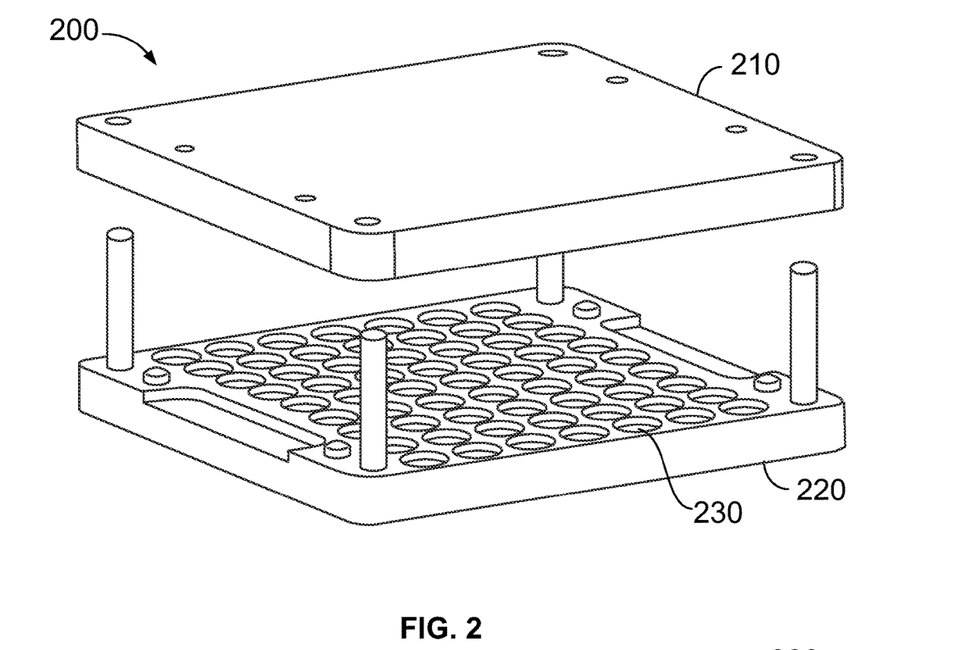
FIG. 2 illustrates a press plate assembly for forming shaped cookie dough pieces according to one embodiment of the invention.

FIG. 2 illustrates a press plate assembly 200 for forming shaped dough pieces according to one embodiment of the invention. The press plate assembly 200 includes a top press plate 210 and a bottom press plate 220. Both the top press plate 210 and bottom press plate 220 include cavities, indentations, or receptacles for receiving a dough and shaping or forming the dough. However, from the position of the press plates in FIG. 2, only the bottom press plate cavities 230 are visible, but the top press plate cavities are shown below in FIG. 3.

As described above, in operation a sheet of dough may be introduced between the press plates 210, 220. The press plates 210, 220 may then be brought together into contact with the sheet of dough. Further force may then be applied to the press plates 210, 220 to push them closer together to cause the dough to be introduced into the top and bottom press plate cavities. As force is applied, the dough is forced into the cavities and assumes the shape of the cavities.

However, the press plates 210, 220 are preferably not brought fully into contact so that a portion of the sheet of dough still extends between each shaped dough region formed by the upper and lower press plate cavities. This remaining dough joining the shaped dough regions is referred to as the web. The web may have a range of heights or thicknesses depending on process equipment, desired line speed, and dough formula, but may have a thickness of 1 mm in one embodiment.

Figure 3:
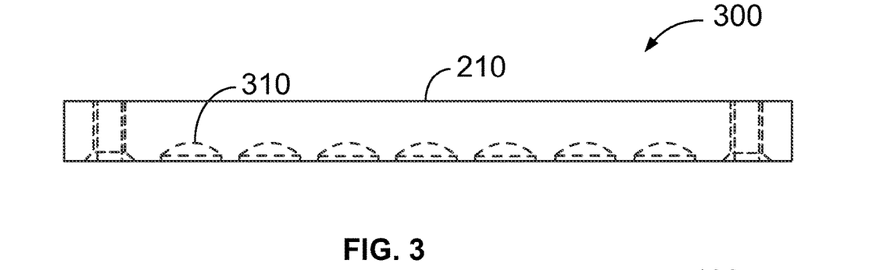
FIG. 3 is a side transparent view of the top press plate that shows the top press plate cavities.

FIG. 3 is a side transparent view 300 of the top press plate 210 that shows the top press plate cavities 310.

Figure 4:
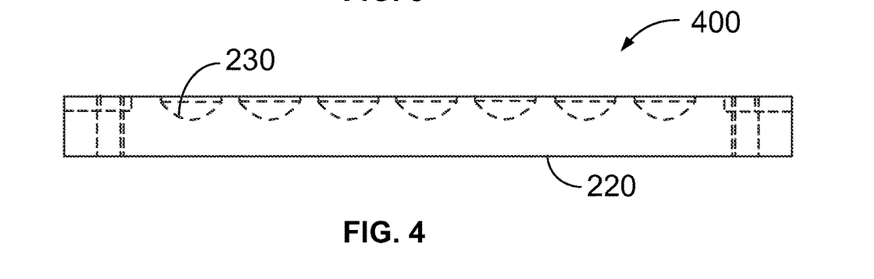
FIG. 4 is a side transparent view of the bottom press plate that shows the bottom press plate cavities.

FIG. 4 is a side transparent view 400 of the bottom press plate 220 that shows the bottom press plate cavities 230. As described below, the cavity size may vary, but in one embodiment the height of the top press plate cavities 310 may be less than the height of the bottom press plate cavities 230.

Figure 5:
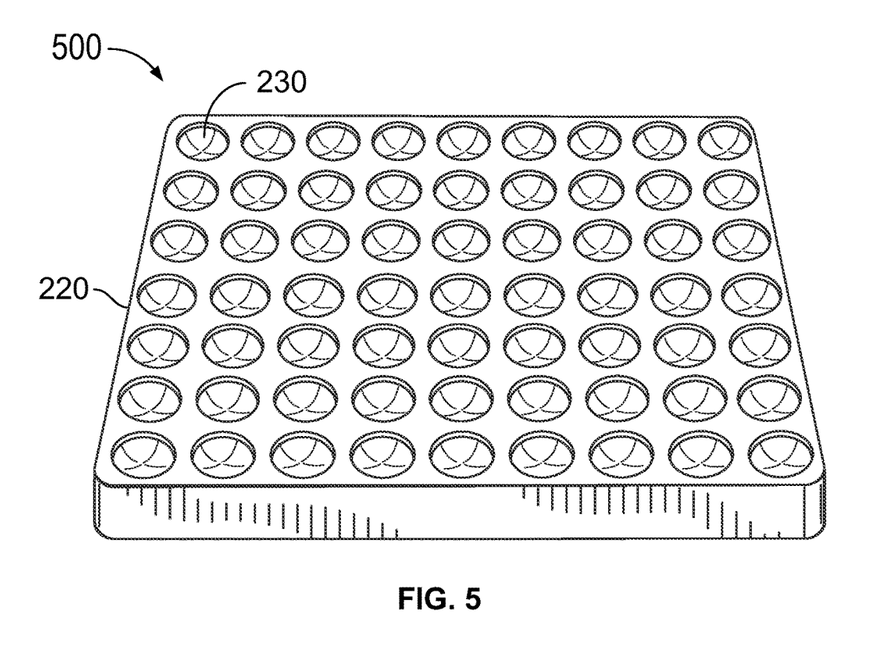
FIG. 5 is a perspective view of the bottom press plate that shows the bottom press plate cavities.

FIG. 5 is a perspective view 500 of the bottom press plate 220 that shows the bottom press plate cavities 230. Although the bottom press plate cavities 230 are uniform in FIG. 5, in an alternative embodiment, the dimensions and shapes of the cavities may vary.

Figure 6:
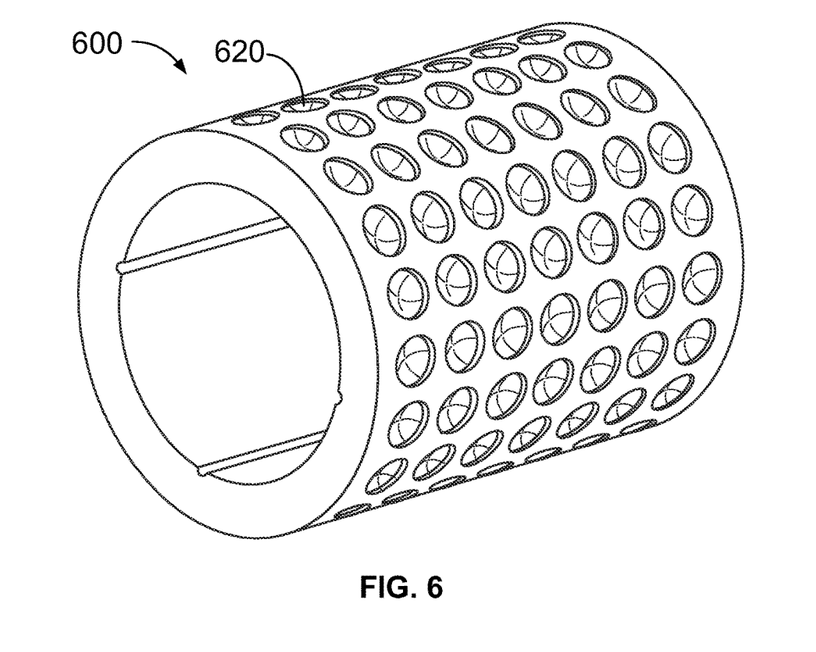
FIG. 6 illustrates a roller for a rotating roller system for forming the shaped cookie dough pieces.

FIG. 6 illustrates a roller 600 for a rotating roller system for forming the dough. The roller 600 includes a plurality of roller cavities 620.

Figure 7:
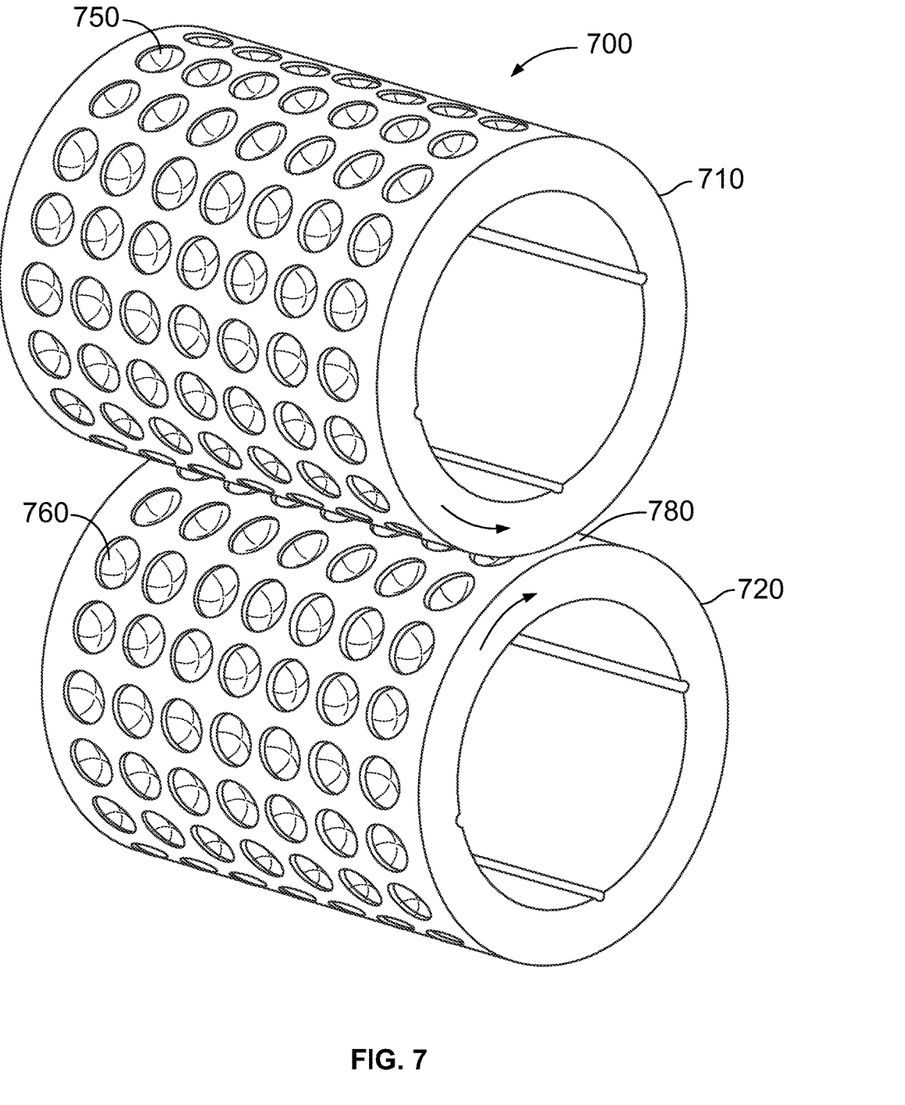
FIG. 7 illustrates the relative positioning of a top roll and a bottom roll in a rotating roller system for forming the shaped pieces of cookie dough.

FIG. 7 illustrates the relative positioning 700 of a top roll 710 and a bottom roll 720 in a rotating roller system for forming the shaped pieces of dough. The top roll 710 includes top roll cavities 750 and the bottom roll 720 includes bottom roll cavities 760. As shown in FIG. 7, the top roll 710 and the bottom roll 720 are not in contact and are separated by a roll separation distance 780.

In one embodiment, a sheet of dough may be introduced between the top roll 710 and the bottom roll 720. Once introduced, the rotating action of the top and bottom rolls 710, 720 advances the sheet of dough between the rolls. Additionally, the roll separation distance 780 is less than the height or thickness of the sheet of dough that is introduced. Consequently, as the sheet of dough passes between the top and bottom rolls 710, 720, the dough is induced or forced into the top and bottom roll cavities 750, 760 and assumes the contours of these cavities. Further, because the top and bottom roll cavities 750, 760 are aligned, three-dimensional, shaped dough regions are formed in the dough sheet.

As with the press plates of FIG. 2 above, the separation of the top and bottom rolls 710, 720 allows the shaped regions of the dough to be connected by a web of dough. The web of dough is thinner or of lesser height than the original sheet of dough, but is preferably thick enough to hold the shaped regions together during the succeeding processing steps.

Figure 8:
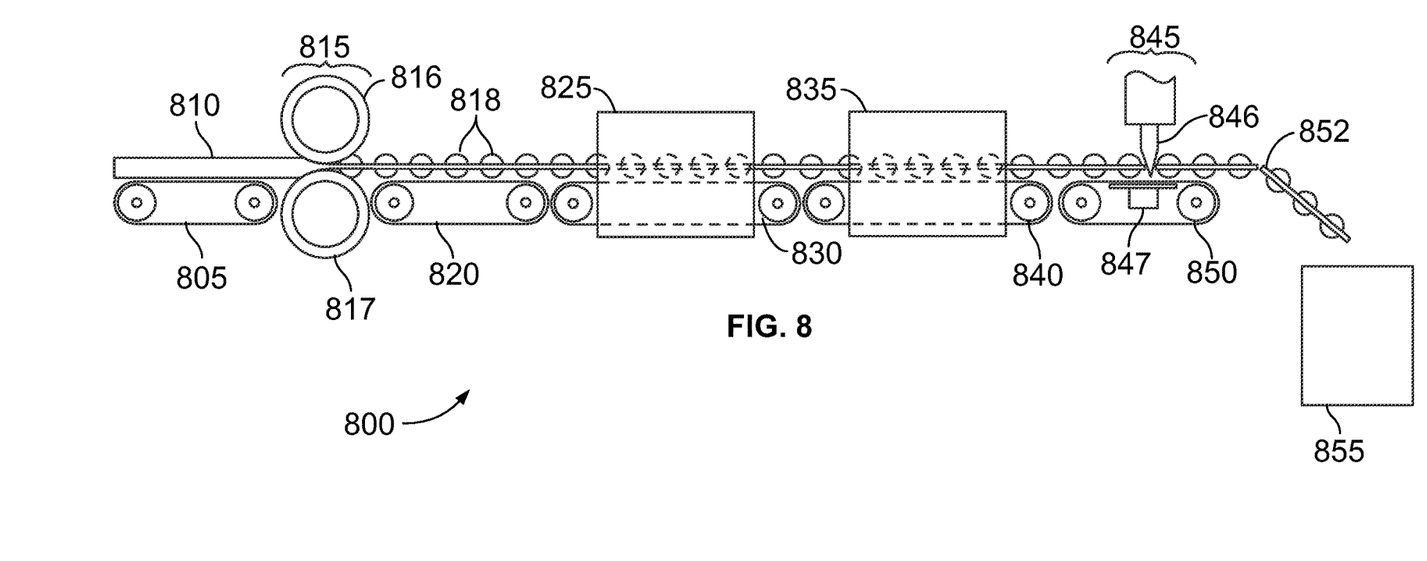
FIG. 8 illustrates a system producing shaped baked goods according to an embodiment of the present invention.

FIG. 8 illustrates a system for producing shaped baked goods 800 according to an embodiment of the present invention. The system for producing shaped baked goods 800 includes a dough sheet conveyor 805, a sheet of dough 810, rotating roller system 815 including a top roller 816 and a bottom roller 817, a plurality of shaped dough regions 818, a roller output conveyor 820, a baking system 825, a baking system conveyor 830, a rehydration system 835, a rehydration system conveyor 840, a separating system 845 including a blade 846 and an anvil 847, a separating system conveyor 850, separated pieces of the baked web 852, and a deflashing system 855.

In operation, as described above, the dough conveyor 805 introduces the sheet of dough 810 to the rotating roller system 815. The sheet of dough 810 engages between the top roller 816 and the bottom roller 817 and is formed into a web of dough including shaped dough regions 818. The resulting web is then passed by the roller output conveyor 820 to the baking system 825.

Alternatively, instead of using the rotating roller system 815, a system of opposing press plates, such as those shown in FIG. 2, may be employed. In one embodiment of the process, the dough is sheeted prior to shaping and may be cooled prior to shaping. Further the shaping may include passing the sheeted dough through a plurality of horizontal or vertical rotary molds.

In some embodiments the dough is preferably in granular form prior to shaping and the shaping method preferably comprises feeding the granular dough into a pair of vertical rotary molds, where the feeding includes a feed mechanism (such as vibration, for example) to maintain a consistent flow of granular dough.

In one embodiment, one or more of the rollers are maintained at an ambient temperature of about 20 degrees C. to about 35 degrees C. or more preferably at a temperature of about 25-30 degrees C. In another embodiment, one or more of the rollers are maintained at about 0 degrees C. to about −20 degrees C. In one embodiment the pieces may be baked and shaped at the same time. Further, the rollers may be heated to a temperature of at least 150 degrees C.

The baking system 825 may be an oven or a similar device for heating the web of dough. For example, the baking system 825 may include providing heat to the web of dough from the top, bottom, from the side, or any combination of directions. Additionally, the baking system may employ convection or indirect heat. Additionally, the baking system 825 may employ multiple heat delivery modalities such as traditional baking, infrared heating, and/or microwave heating or any combination thereof.

The baking system 825 bakes the web of dough including the shaped regions 818. As further described below, as a result of baking, the relative thicknesses or heights of the top and bottom half of the shaped region may or may not change.

In one embodiment, the webbed dough sheet is placed on a conveyor belt prior to said baking and the conveyor belt may have depressions to generally conform to the shape of the shaped dough regions created by said rollers, such as elliptical, rounded, lenticular, ovoid, or spherical depressions.

In some embodiments, a cookie dough is formed into individual pieces that may be baked in a very loose single layer on a sheet pan at 200 degrees C. for about 14 minutes—or until golden. The cookie pieces may then cool for about 5 minutes and harden. The hardened cookie pieces may then be removed from the pan. It is noted that when the cookie pieces are placed on the pan as individual pieces, the less the cookie pieces touch each other during baking, the easier they are to separate afterwards.

In some embodiments of the baking step for the cookie dough, the baking step is preferably performed at a high temperature (for example, at, near or about 200 degrees C.) and is preferably performed at a fast time (for example about 8-13 minutes).

In one embodiment, the baking includes using a multi-stage bake oven, wherein at least one stage of said multi-stage bake oven involves a bake temperature of at least 200 degrees C. and a bake time of from about 7 minutes to about 15 minutes.

After the baking system 825, the baked webbed sheet comprising shaped baked good regions corresponding to the shaped dough regions passes along the rehydration system conveyor 840 to the rehydration system 835. At the rehydration system 835, the baked web may be rehydrated, rehumidified, and/or cooled. When rehumidification is performed, the baked cookies may be rehumidified as shown in U.S. Pat. Nos. 6,555,150 and 6,207,207, for example.

After the rehydration system 835, the baked web of shaped baked good regions passes along the separating system conveyor 850 to the separating system 845. At the separating system 845, a blade 845 is positioned relative to an anvil 847. As the web passes between the blade 845 and anvil 847, the blade is induced downward into the web between the shaped baked good regions in order to separate the web into short separated pieces of the baked web 852 composed of rows of shaped baked good regions.

In the example of FIG. 8, the separating system 845 is illustrated as a blade-and-anvil type separating system, but other separating systems may be used such as cutting, crushing, folding, friction, gravity, or force-based separation. Additionally, although the separated pieces of the baked web 852 are shown as having three rows, a greater or lesser number of rows may be formed. Additionally, the blade may separate the baked web in multiple directions such as transverse to the direction of advancement of the web (as shown in FIG. 8) as well as parallel to the direction of advancement of the web. Additionally, multiple systems may be employed to separate the baked web such as multiple blades, for example.

Next, the separating system conveyor 850 passes the separated pieces of the baked web 852 to the deflashing system 855. In the deflashing system, separated pieces of the baked web 852 are broken into individual shaped baked goods and the remains of the baked web are removed from the individual shaped baked goods. In one embodiment, the deflashing system 855 may be a rotating vessel or container that allows rotation to provide friction to break up the web and remove the flashing from the shaped baked goods by allowing them to grind or rub against one another. Alternatively, the deflashing may be accomplished by any standard deflashing process such as by breaking and tumbling with gravity or air-assisted removal of the webbing material.

For multi-region embodiments, the shaped baked goods may be coated with a fat-containing substance such as chocolate by any suitable fashion, such as, but not limited to, curtain coating where a molten fat-containing substance is poured over the shaped baked goods as they pass under a curtain of molten fat-containing substance, dunk coating where the shaped baked goods pass through a pool of molten fat-containing substance and are thus dunked in the fat-containing substance, and panning where the shaped baked goods are placed in a coating pan that is rotated to tumble the shaped baked goods while molten fat-containing substance such as chocolate is periodically added to the pan.

For multi-region embodiments with more than two regions, the coated shaped baked goods may be further coated or enrobed by any standard process such as sugar panning where the coated shaped baked goods are placed in a coating pan that is rotated to tumble the shaped baked goods while carbohydrate solutions such as sugar solutions are periodically added to the pan.

In one or more embodiments, the shaped dough region may be symmetric or asymmetric about the plane of the web, and the resulting shaped baked good may be elliptical, lenticular, ovoid, rounded, or spherical in shape.

In one embodiment, the upper and lower portions (above and below the plane of the web) of the asymmetrically-shaped dough region are not the same shape. For example, the lower portion of the region may be deeper and the upper portion may be less deep. Additionally, the side profile of the dough region may be such that the upper portion is flatter (less rounded) and the lower portion is more rounded. In one embodiment, the lower portion of the dough region has a steeper pitched or a steeper angled depth than the upper portion. In one embodiment, although the portions of the dough region are slightly different sizes when formed, the baking process may cause structural differences in the region so that after baking the depths of the upper and lower portions appear uniform. For example, the upper portion may rise by a greater amount than the lower portion during baking because the lower portion is pressed down by the weight of the upper portion while the upper portion is not similarly pressed down.

Figure 9:
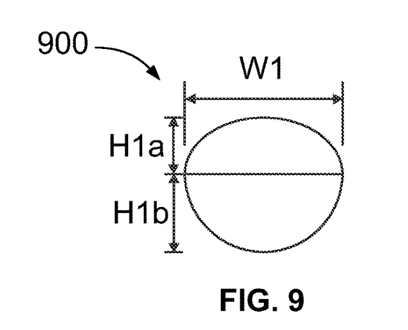
FIG. 9 illustrates an example of the relative dimensions of a lenticularly shaped cookie dough piece prior to baking with the web not shown.

FIG. 9 illustrates an example of the relative dimensions of a lenticularly shaped cookie dough piece 900 prior to baking with the web not shown. As seen in FIG. 9, the lenticularly shaped cookie dough piece 900 has a width W1, a top half height H1a and a bottom half height H1b. Further the top half height is shown to be less than the bottom half height in the example of FIG. 9. As discussed above, this variance in height may be provided by varying the depth of the top and bottom press plates or top and bottom rollers.

Figure 10:
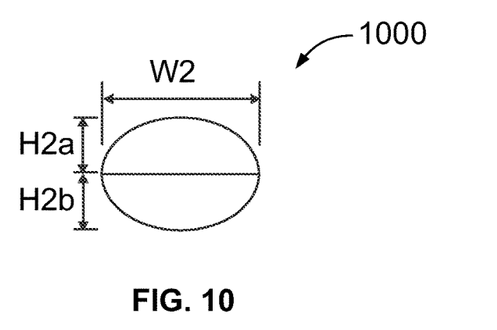
FIG. 10 illustrates an example of the relative dimensions of the lenticularly shaped cookie dough piece of FIG. 9 after baking with the web not shown.

FIG. 10 illustrates an example of the relative dimensions of the lenticularly shaped cookie dough piece of FIG. 9 after baking 1000 with the web not shown. Again, a width W2, a top half height H2a, and a bottom half height H2b are shown. As shown in the example of FIG. 10, the width W2 is substantially the same as the width W1. Additionally, the height H2a of the piece after baking is substantially the same as the height H1a before baking. However, the height H2b of the piece after baking is now shown to be less than the height H1b before baking. Additionally, the height of both the top half H2a and bottom half H2b of the piece after baking are shown to be substantially similar. Thus, although the top and bottom halves of the dough piece are different heights or thicknesses before baking, the relative heights of both halves have been selected so that, as a result of the baking process, the relative heights of both halves of the baked piece become substantially the same in order to form a substantially symmetric lenticular piece.

However, as further discussed below, FIGS. 9 and 10 are merely one embodiment, and the relative sizes of the top and bottom halves of the dough piece may be selected so that the resulting baked cookie piece is not symmetric.

Thus, in some embodiments, the shaped baked good includes an upper portion and a lower portion, and said lower portion has a different shape, volume and/or area than said upper portion. In some embodiments, the shaped baked good has a first shape prior to baking and a second shape after baking. In some embodiments, the first shape is asymmetric and the second shape is symmetric. In some embodiments, the first shape includes a portion of the shaped baked good that has a diameter that is 25-40% larger than the remaining portion while the smaller diameter portion has a height that is 15-35% larger than the larger diameter portion. The portion with the smaller diameter and larger height is placed on the baking surface. When the smaller diameter and larger height portion is placed on the baking surface, it may spread somewhat during baking to provide a shaped baked good with a symmetric shape after baking.

Figure 11:
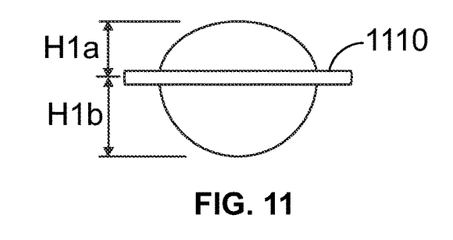
FIG. 11 illustrates an example of the lenticularly shaped cookie dough piece prior to baking of FIG. 9 with the web shown.

FIG. 11 illustrates an example of the lenticularly shaped cookie dough piece prior to baking of FIG. 9 with the web 1110 shown. FIG. 11 illustrates one embodiment of how the lenticularly shaped cookie dough piece may be positioned in the web 1110. The web 1110 was removed in FIG. 9 for ease of showing the relative dimensions of the top and bottom halves of the dough piece.

Figure 12:
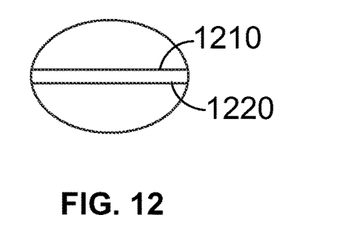
FIG. 12 illustrates an example of the lenticularly shaped cookie dough piece of FIG. 11 after baking with the web removed or deflashed.

FIG. 12 illustrates an example of the lenticularly shaped cookie dough piece of FIG. 11 after baking with the web 1110 removed or deflashed. In the embodiment of FIG. 12, the top extent of the web 1210 and bottom extent of the web 1220 remain visible on the baked lenticularly shaped cookie piece after deflashing. This structure may also be known as a dough ring, Saturn ring, and/or hamburger. Alternatively, a different dough formula may be employed to minimize the appearance of the indents.

Figure 13:
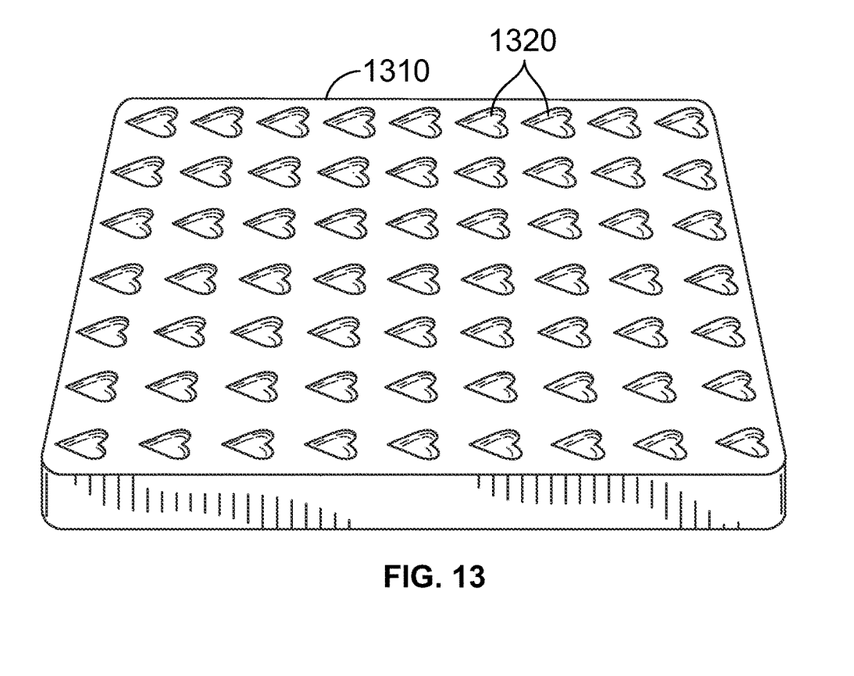
FIG. 13 illustrates an alternative heart shape press plate for forming heart-shaped cookie dough pieces.

FIG. 13 illustrates an alternative heart shape press plate 1310 for forming heart-shaped baked goods. Similar to the press plates shown in FIGS. 2-5 above, the heart shape press plate 1310 includes a plurality of heart-shaped cavities 1320. The heart shaped press plate 1310 may be used in a similar system to that shown in FIG. 2 wherein the heart shape press plate 1310 may be positioned opposing another press plate with similar heart shapes and then brought together to introduce a dough into the heart shaped cavities to form heart shaped regions in a dough web. The remaining processing steps may be similar to those described above.

With regard to the dough webbing formed between the symmetrically-shaped or asymmetrically-shaped dough regions, in one embodiment, the interconnected layer/sheet of dough that holds the regions together may be helpful in assisting the regions to remain in an upright position during baking. This may provide for more even baking and/or a more preferable shape.

In one embodiment, the dough web outside of the shaped dough regions may have a thickness in the range of 0.5 to 3 mm with a preferable range from 0.5 to 2 mm. However, the preferred thickness of the web may vary depending on several factors, such as: the depth and/or size of the shaped dough regions, the desired run speed of the production line, and the specific formula chosen. Additionally, the thickness of the web may be adjustable, for example by a manual and/or automatic system.

Preferably, the thickness of the web is sufficient to allow the web to convey the shaped dough regions without breaking, but still thin enough to be easily broken and de-flashed after baking.

In one or more embodiments, the shaped baked good may be a pretzel, cracker, biscuit, shortbread, or cookie. In one or more of such embodiments, rehumidification and/or rehydration is preferably performed. For example, a specific moisture or water activity level may be desirable and may be controlled by rehumidification. In one example, a specific water activity level may be desired for a specific confectionary processing activity, such as to perform sugar shelling or panning of the shaped baked good.

In one or more embodiments, the shaped baked good may be cooled for up to 24 hours. However, in other embodiments, the cooling time may be significantly lower, and may depend on one or more of the baked good piece size, the formula/recipe employed, and/or the desired subsequent confectionary processing.

In addition to the elliptical, lenticular, ovoid, rounded, and spherical shapes mentioned above, the shaped baked good may be delivered in any of a variety of shapes and/or sizes. For example, a heart shape, animal cracker shapes, cylindrical shapes, shapes with a belly band, or other three-dimensional shapes.

In one or more embodiments of the press plates and/or rollers, the surface and/or cavities of the press plates/and or rollers may include a coating to aid in the release of the shaped dough from the surface and/or cavities. For example, the coating may be a nonstick coating such as oil or Teflon®.

Additionally, when ejecting the shaped dough regions from the press plate, the ejection may be accomplished using one or more ejection systems. In addition to those ejection mechanisms described above, the plate may be inverted and the dough web removed by suction on the web. Alternatively, one or more areas of the plate may be spring loaded or may use a plunger to separate the web from the plate.

Additionally, when using the opposing rollers, the rollers may be oriented one-above-the-other so that the dough web that is formed emerges from the rollers in a horizontal orientation. Alternatively, the rollers may be positioned in angles ranging up to side-by side so that the web emerges in an angled or vertical orientation.

In one or more embodiments, the shaped dough may be formed using press plates and/or rollers maintained at a temperature between 0 and −20 degrees Celsius. Alternatively, in one or more embodiments, the press plates and/or rollers may be maintained at an ambient temperature such as around 20-30 degrees Celsius. In one or more embodiments, one or more steps of the process may be controlled to take place between 20 and 40% relative humidity.

In one embodiment, opposing press plates and/or rollers may include cavities with depths of 0.125 inches (3.2 mm) and 0.118 inches (3.0 mm), respectively. Alternatively, the cavities of the opposing plates may have depths of 0.155 inches (3.9 mm) and 0.118 inches (3.0 mm) respectively. Additionally, the cavities may range from about 0.1 inches (2.5 mm) to about 1 inch (25.4 mm) in depth.

Also, in one or more embodiments, the cavities may be in the shape of a portion of an ellipsoid, lentil, rounded, ovoid, sphere, or other three-dimensional shape. Therefore, when a dough is forced into two opposing cavities, the dough may assume an elliptical, lenticular, rounded, ovoid, or spherical shape. Additionally, the opposing cavities that come together to form the three-dimensional shape may have different shapes. More specifically, in one embodiment of the shaped baked good, the shaped baked good is spherical or lenticular (for example, an M&M'S® Brand Milk Chocolate Candies shape). If lenticular, the shaped baked good may have a height of 6.0-6.5 mm and a diameter of 9-12 mm. If spherical, the shaped baked good may have a diameter of 10-12 mm.

Additionally, although embodiments may employ an elliptical, ovoid, rounded, spherical, or lenticular shape, the shape of the shaped baked good is not so limited and need not be completely or even partially rounded. The shaped baked good may be in any shape desired, such as a "gummy bear", tube, or other shape, for example.

Additionally, the shaped baked goods preferably minimize or eliminate flat regions on the top and/or bottom of the shaped baked good.

Additionally, one or more of the embodiments described herein provides a shaped baked good that minimally deforms during its processing step, such as baking. For example, minimal deformation may provide a change in product dimension such as height, thickness, or width by 20% or less, more preferably by 10% or less, and even more preferably by 5% or less.

Additionally, the shaped baked goods may be used as a rounded baked good that may be used to form a multi-region confection such as when the rounded baked good is used as the center of a chocolate and sugar coated product such as M&M'S® Brand Milk Chocolate Candies, for example.

To use such a baked good as the center of a rounded product, the rounded shape of the baked good is preferably maintained during formation and baking. In one or more of the embodiments herein, by using a high melting point fat and granular sugar at a weight ratio of about 1:1, a dough suitable for forming into rounded shapes that withstand baking without forming noticeable flattened areas is provided.

Additionally, although the shaped baked good in one or more of the embodiments is then coated with chocolate to form a multi-region confection, and the resulting multi-region confection is then coated with a carbohydrate such as sugar, the shaped baked good may instead be coated with carbohydrate and then coated with chocolate or it may be coated with carbohydrate alone or it may be not coated at all and may be sold or consumed in an uncoated state. Alternatively, the shaped baked good may be only partially coated.

In embodiments where the shaped baked good is coated with carbohydrate, either with or without a fat-containing region or coating, the carbohydrate can be a nutritive or normutritive carbohydrate material selected from the group consisting of sucrose, fructose, dextrose, sorbitol, maltitol, mannitol, isomalt, erythritol, xylitol, and combinations thereof.

In embodiments where the shaped baked good is coated with a fat-containing substance such as chocolate, the fat-containing substance may be selected from the group consisting of Standard of Identity chocolate, compound coating, white chocolate, fat containing composition and combinations thereof.

Regarding chocolate, the term "chocolate" refers to a solid or semi-plastic food and is intended to refer to all chocolate or chocolate-like compositions containing a dispersion of solids within a fat phase. The term is intended to include compositions conforming to the U.S. Standards Of Identity (SOI), CODEX Alimentarius and/or other international standards and compositions not conforming to the U.S. Standards Of Identity or other international standards. The term includes sweet chocolate, bittersweet or semisweet chocolate, milk chocolate, buttermilk chocolate, skim milk chocolate, mixed dairy product chocolate, sweet cocoa and vegetable fat coating, sweet chocolate and vegetable fat coating, milk chocolate and vegetable fat coating, vegetable fat based coating, pastels including white chocolate or coating made with cocoa butter or vegetable fat or a combination of these, nutritionally modified chocolate-like compositions (chocolates or coatings made with reduced calorie ingredients) and low fat chocolates, unless specifically identified otherwise.

In the United States, chocolate is subject to a standard of identity established by the U.S. Food and Drug Administration (FDA) under the Federal Food, Drug and Cosmetic Act. Definitions and standards for the various types of chocolate are well established in the U.S. Nonstandardized chocolates are those chocolates which have compositions that fall outside the specified ranges of the standardized chocolates.

Regarding white chocolate, in 2002, the U.S. Food and Drug Administration (USFDA) established a standard of identity (SOI) for white chocolate, which became effective on Jan. 1, 2004. 67FR62171. In accordance with this standard, an SOI white chocolate contains not less than 20% by weight cacao fat, i.e., cocoa butter, not less than 14% by weight of total milk solids and not less than 3.5% by weight milkfat. In addition, SOI white chocolate in the U.S. cannot contain more than 55% by weight of nutritive carbohydrate sweetener.

In Europe, white chocolate is similarly defined with the exception that there is no limit on the content of nutritive carbohydrate sweetener. See Directive 2000/36/EC (Jun. 23, 2000). The standard of identity for white chocolate in Canada is set forth in Canadian Food and Drug Regulations, C.R.C., c.870, Section B.04.009, pp. 218-219. The standard of identity for chocolate in Australia is set forth in Australia New Zealand Food Standards Code, Chapter 1, Standard 1.1.2—Supplementary Definitions for Foods, which applies to any product named "chocolate," including white chocolate.

White chocolate-like products are also made that are substantially free of nonfat cocoa solids but that do not meet a standard of identity for white chocolate. These products are often referred to as non-standard of identity (non-SOI) white chocolates, and are known in the art by such names as white compound coating and white confectionery coating. Such non-SOI white chocolates typically comprise other vegetable-derived fats and/or oils in addition to or as a replacement for cocoa butter or milkfat. For example, they may contain palm oil, coconut oil, partially hydrogenated palm kernel oil, and other such components. They may also comprise other sweeteners in addition to or as a replacement for nutritive carbohydrate sweeteners. In addition, they may contain colors, flavors, and other ingredients that may not be permitted in a white chocolate according to the requirements of a standard of identity.

Regarding fat-containing compositions, these can include, but are not limited to, caramels, nougats, taffies, cheese, and other compositions with at least 10% fat.

Additionally, the shaped baked good may be added to other edible substances, such as ice cream, for example. Additionally, the shaped baked good may be used as inclusions in chocolate bars or used as toppings.

With regard to the process of making the shaped baked good, in one embodiment, a starch, a fat, and a sugar are mixed to form a dough, wherein the dough has a moisture content before baking of from about 8% to about 15% w/w by weight of the shaped baked good.

In one embodiment the ingredients are mixed, blended, and/or prepared together prior to forming and baking. In some embodiments, the high melting point fat is melted until liquid and then the sugar and other oleaginous components such as flavors and emulsifiers are added with continued mixing to form a homogeneous fat/sugar mixture.

Separately, water soluble components such as salt and sodium bicarbonate are mixed together with water to form a water solution.

Once the fat/sugar mixture is homogenous, the water solution can be added, preferably in 3-4 parts.

Next, a flour component is scaled and added into the mixing bowl and blended until coarse granules form. At this point, inclusions such as chocolate chips, nuts, coconut particles, etc. can be blended in. Preferably, the finished dough forms dry powdery granules. The dough is preferably fairly dry, but clumps when pressed together to be baked.

In some embodiments, at least a portion of a sugar with a particle size range of from about 400 microns to about 2000 microns can be added at the last stage of mixing.

Further the mixing may include adding water to the starch or flour component then adding the fat and then adding the sugar.

In some embodiments, pulverizing may be performed before adding chocolate chips. Pulverization can be accomplished by any standard process.

Turning now to one or more embodiments of the formula for the shaped baked good, in one embodiment, the shaped baked good may include a high melting point fat and a granular sugar, preferably in a weight ratio at, near, or about 1:1. By using such a high melting point fat and granular sugar at a weight ratio of about 1:1, a dough suitable for forming into rounded shapes that withstand baking without flattening is provided.

In some embodiments, the fat is a high melting point fat that is selected from the group consisting of palm oil, palm kernel oil, dairy butter, peanut butter, anhydrous milk fat, lard, margarine, vegetable shortening, cocoa butter, corn oil, sunflower oil, hydrogenated vegetable fats, and/or combinations thereof. These fats may have melting points in the range of 30 to 50 degrees Celsius or at least 30 degrees Celsius in one embodiment. In some embodiments, the high melting point fat is present in an amount of from about 15% to about 25% w/w by weight of the shaped baked good.

In some embodiments, the sugar or other carbohydrate component is selected from the group consisting of granular, refined, and milled sucrose products, brown sugar, powdered corn syrup, granulated molasses, crystalline lactose, crystalline fructose, crystalline dextrose, or another sweetener or combinations thereof. In some embodiments, the sugar or other carbohydrate component is a granular sugar that has a particle size range of from about 400 microns to about 2000 microns. In other embodiments, the sugar has a particle size range of from about 400 microns to about 800 microns or from 700 microns to about 1500 microns. Further, the shaped baked good has sugar at a level of from about 10% to about 25% w/w by weight of the shaped baked good.

In some embodiments, the weight ratio of high melting point fat to carbohydrate can be from about 0.8 to 1.2, that is, a numerical value of about 0.7, to about 1.2 to 0.8, that is, a numerical value of about 1.5. In another embodiment, the fat to sugar weight ratio may be in the numerical value range of 0.7 to 1.7 with a more preferred range from 1 to 1.4.

In some embodiments, the shaped baked good also includes a starch. The starch can be selected from the group consisting of wheat flour, whole wheat flour, hard wheat flour, soft wheat flour, oatmeal, cocoa powder, peanut flour, modified starches, and combinations thereof. In some embodiments, the starch is present in an amount of from about 30% to about 65% w/w by weight of the shaped baked good.

In some embodiments, the shaped baked good has a moisture content before baking of from about 8% to about 15% w/w by weight of the shaped baked good. In other embodiments, the shaped baked good has a moisture content before baking of from about 9% to about 11% and in still other embodiments from about 11% to about 14%.

Additionally, in one embodiment the shaped baked good has a moisture content after baking of from about 2% to about 8% or from about 2.7% to about 4.0% and more preferably from about 4% to about 6% w/w by weight of the shaped baked good.

Additionally, in one embodiment the shaped baked good has a water activity of from about 0.11 to about 0.34 or from about 0.3 to about 0.4 after baking.

Additionally, the sugar particle size may be any of 4 wt % max retained on US20 (841-micron) sieve, 6 wt % max retained on US16 (1190-micron) sieve, powdered: 1 wt % max retained on US100 (149-micron) sieve, granulated: 4 wt % max retained on US20 (841-micron) sieve, 0.3 wt % max retained on US20 (841-micron) sieve, and 0.5 wt % max retained on US12 (1680-micron) sieve.

Additionally, the formula may include added water at cold, ambient, or warm temperature.

Additionally, the formula may include additional ingredients such as sanding sugar, rolled oats, corn fibers, oat bran, and/or gum acacia, and inclusions such as chocolate chips, fruit pieces, candy pieces, and/or nut pieces.

EXAMPLES

One embodiment of a formula or recipe for a cookie dough for producing the shaped baked good appears below in Table 1. It is noted that the formula in Table 1 may be made without flavoring (for example, for testing purposes) and may alternately be made with an added flavor, such as a chocolate or vanilla flavor.

TABLE 1

Base Chocolate Chip Cookie Recipe

| Ingredient | Weight % |
|---|---|
| Soft Wheat flour | 47.86% |
| Palm Kernel Oil (1R631) | 16.41% |
| Light Brown Sugar (granular) | 16.35% |
| Ethyl Vanillin | 0.05% |
| Water | 2.98% |
| Soy Lecithin | 0.34% |
| Salt Flour | 0.60% |
| Sodium Bicarb | 0.17% |
| Oil-based flavor | 0.26% |
| 10,000 ct. Choco. Chips | 15.00% |
| | 100% |

Turning now to a further description of one embodiment of preparing the cookie pieces using the formula of Table 1, the preparation proceeds as follows: First, the palm kernel oil (PKO) is melted until it is liquid. Next, the sugar, vanillin, and lecithin are preferably scaled into a mixing bowl. Next, the melted PKO is added to the mixing bowl and the contents of the bowl are blended using a mixer with a paddle attachment until the mixture is homogenous. The homogenous mixture may be described as a fat/sugar mixture.

Separately, the salt, sodium bicarbonate, and water are mixed together. This mixture may be described as a water solution. Once the fat/sugar mixture is homogenous, the water solution is added, preferably in 3-4 parts.

Next, the flour is scaled and added into the mixing bowl. The contents of the mixing bowl are then blended until coarse granules form. Next, the chocolate chips may be blended into the mixture until mixed. Preferably, the finished dough forms dry powdery granules. The dough is preferably fairly dry, but clumps when pressed together to be baked.

Next, the granular cookie dough may be deposited or positioned in a Thomas Mills or Microvert Depositor. The cookie dough may then be baked. Next, the webbing between individual cookie pieces may be removed. The cookie dough may be baked in a very loose single layer on a sheet pan at 200 degrees C. for about 14 minutes—or until golden. The cookie pieces may then cool for about 5 minutes and harden. The hardened cookie pieces may then be removed. It is noted that the less the cookie pieces touch during baking the easier they are to separate afterwards.

Additionally, although in the embodiment above the cookie pieces are baked, the cookie pieces need not be baked and may be prepared or processed in other ways. For example, the cookie pieces may be ultrasonically processed, fried, boiled, or otherwise prepared.

Table 2 illustrates several embodiments of the dough formula for the shaped baked good according to one or more embodiments, where weight percentages are given as percent by weight of the prepared dough.

TABLE 2

| Flour (wt %) | Sugar (wt %) | Added water (wt %) | Fat (wt %) | Fat-to-Sugar Ratio | Type of Sugar Used | Type of Fat Used |
|---|---|---|---|---|---|---|
| 55 | 20 | 3.5 | 20.0 | 1.0 | Sucrose (granulated, sanding) | Palm kernel oil (PKO) |
| 56 | 19 | 3.5 | 19.0 | 1.0 | Sucrose (granulated, molasses, brown, sanding) | PKO, anhydrous milk fat (AMF), butter, palm oil |
| 55 | 18.5 | 6 | 18.5 | 1.0 | Sucrose (granulated) | PKO |
| 53 | 18 | 9 | 18.0 | 1.0 | Sucrose (granulated) | PKO |
| 53 | 16 | 17 | 18.0 | 1.1 | Sucrose (granulated) | PKO |
| 49 | 15 | 17 | 16.0 | 1.1 | Sucrose (granulated) | PKO, butter, peanut butter |
| 56 | 13 | 11.4 | 17.6 | 1.4 | Sucrose (granulated) | PKO |

Table 3 presents several non-working embodiments.

TABLE 3

| Flour (wt %) | Sugar (wt %) | Added water (wt %) | Fat (wt %) | Accessory (wt %) | Fat-to-Sugar Ratio | Type of Sugar Used | Type of Fat Used | Comments |
|---|---|---|---|---|---|---|---|---|
| 55 | 20 | 4 | 20 | | 1.0 | Sucrose (granulated, brown) | Palm kernel oil (PKO) | Too sticky |
| 42 | 9.3 | 9 | 16 | 16 | 1.7 | Corn syrup, polydextrose | PKO | Too sticky |
| 48 | 11 | 11 | 19 | 3 | 1.7 | Sucrose (granulated, brown) | PKO | Too sticky |
| 42 | 9 | 9 | 17 | 2 | 1.9 | Sucrose (granulated, brown) | PKO | Too sticky |
| 57 | 15 | 10 | 15 | | 1.0 | Sucrose (granulated, brown) | Peanut oils - did not work with temp of rolls above frozen | Too sticky |
| 31 | 20 | 9.6 | 34 | | 1.7 | Sucrose (granulated, brown) | Peanut oils - did not work with temp of rolls above frozen | Too sticky |
| 36 | 19 | 6.4 | 20 | | 1.1 | Sucrose (granulated, brown) | PKO | Spread too much |
| 46 | 25.2 | 8 | 18 | | 0.7 | Sucrose (granulated, brown) | PKO | Spread too much |

Additionally, although the embodiment of the Table 1 formula described above includes chocolate chips, the formula may also be prepared without chocolate chips. Alternatively, some other addition, inclusion, or substance may also be added. For example, fruits, candy bits, nuts, flavor crystals, granola, crispies, and chunks of other edible material such as cookies or caramel.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A method of making a baked good, said method including:
 forming a dough including:
  a high melting point fat; and
  a granular sugar,
 wherein said high melting point fat and said granular sugar are present in a weight ratio of about 1:1;
 forming said dough into a webbed sheet comprising shaped dough regions, the shaped dough regions consisting of dough, by inducing or forcing the dough into opposing cavities so that the shaped dough regions have an upper region above the webbed sheet and a lower region below the webbed sheet; and
 baking said dough to form a baked good, wherein said baked good is substantially symmetric about the plane of the webbed sheet after said baking.

2. The method of claim 1, wherein the opposing cavities are provided on a pair of rollers.

3. The method of claim 1, wherein said dough is sheeted prior to forming.

4. The method of claim 3, wherein the sheeted dough is cooled prior to shaping.

* * * * *